United States Patent [19]

Kokawa et al.

[11] Patent Number: 4,777,585

[45] Date of Patent: Oct. 11, 1988

[54] ANALOGICAL INFERENCE METHOD AND APPARATUS FOR A CONTROL SYSTEM

[75] Inventors: Masasumi Kokawa, Aichi; Mikihiko Onari, Kokubunji; Ryoichi Sasaki, Fujisawa, all of Japan

[73] Assignee: Hitachi, Ltd., Tokyo, Japan

[21] Appl. No.: 825,599

[22] Filed: Feb. 3, 1986

[30] Foreign Application Priority Data

Feb. 6, 1985 [JP] Japan .................................. 60-19916

[51] Int. Cl.$^4$ .............................................. G06F 1/00
[52] U.S. Cl. .................................... 364/164; 364/184; 364/513
[58] Field of Search .......................... 364/164, 184, 513

[56] References Cited

U.S. PATENT DOCUMENTS

| | | | |
|---|---|---|---|
| 4,433,392 | 2/1984 | Beaven | 364/200 |
| 4,479,241 | 10/1984 | Buckley | 364/513 |
| 4,533,991 | 8/1985 | Georgis | 364/164 |
| 4,620,188 | 10/1986 | Sengchanh | 364/773 |
| 4,620,286 | 10/1986 | Smith et al. | 364/513 |

Primary Examiner—Jerry Smith
Assistant Examiner—Allen MacDonald
Attorney, Agent, or Firm—Antonelli, Terry & Wands

[57] ABSTRACT

An analogical inference apparatus for control system is disclosed in which, in order to be able to generate a control signal to a system, which is to be controlled, even when conditions to be premised are unknown, the degree of similarity between the detected control signal from a sensor incorporated in the system and one of the predetermined control conditions stored in a memory is estimated by estimation means, and then a control value is inferred in accordance with the result of the estimation.

15 Claims, 4 Drawing Sheets

FIG. 2
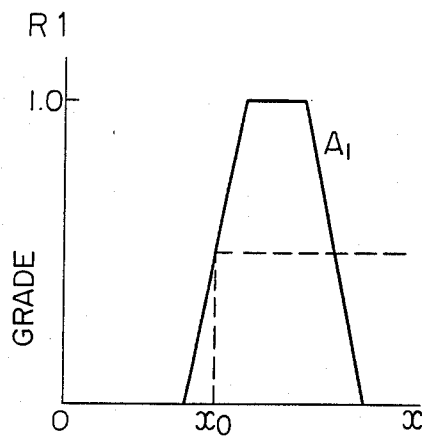
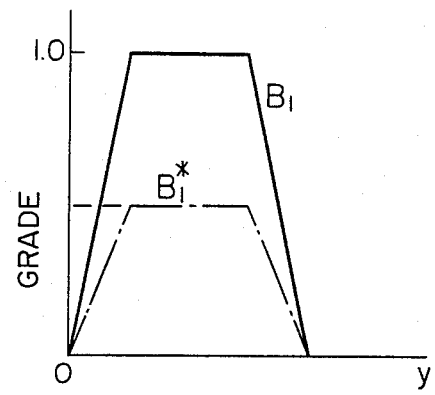
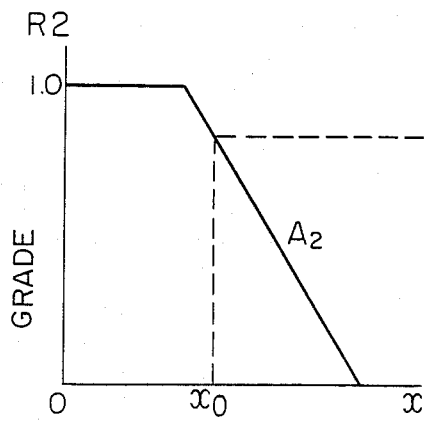
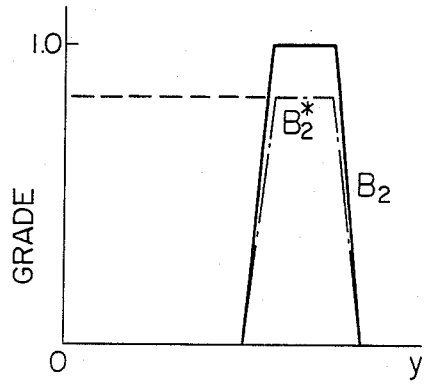

ANALOGICAL INFERENCE METHOD AND APPARATUS FOR A CONTROL SYSTEM

BACKGROUND OF THE INVENTION

The present invention relates to a control system for use in an automobile, in public systems (such as a water supply system, a sewerage system and a traffic system), in a power supply system, and in a nuclear power plant, and more particularly to an analogical inference apparatus for control of a system suitable for use in a case where a detected control condition is fuzzy and is different from predetermined control conditions.

The system control based upon fuzzy control rules has been discussed in an article entitled "Speed Control of Automobile by Fuzzy Logic Controller" by Maeda et al. (Proceeding of 9th system symposium, Aug., 1983, pages 7 to 10). The article describes a simple system control which is achieved by six control rules including a control rule that says "if the control deviation is positive, make the change of the quantity of operation positive". This control method, however, pays no attention to a case where a control condition corresponding to the condition that "if the control deviation is positive", is absent.

SUMMARY OF THE INVENTION

An object of the present invention is to provide an analogical inference apparatus for a control system, in which even when a control precondition (hereinafter referred to as "control condition") is different from predetermined control conditions, a control operation can be performed by estimating the similarity between the control condition and a predetermined control condition and analogically inferring a cotrol value on the basis of the similarity.

In order to attain the above object, according to the present invention, there is provided an analogical inference apparatus control system in which a control condition detected by an operator or sensor is compared with predetermined control conditions, and one of two kinds of operations is performed in accordance with the result of comparison, that is, in a case where the detected control condition is included in the predetermined control conditions, a control operation is performed on the basis of a predetermined control rule, and in a case where the detected control condition is not included in the predetermined control conditions, the degree of similarity between the detected control condition and a predetermined control condition is estimated, and a control value obtained from a predetermined control rule corresponding to the predetermined control condition is modified and inferred in accordance with the degree of similarity.

BRIEF DESCRIPTION OF THE DRAWINGS

FIG. 2 is a graph showing examples of fuzzy control rules.

DESCRIPTION OF THE PREFERRED EMBODIMENT

Now, explanation will be made of an embodiment of an analogical inference apparatus for a control system according to the present invention, by reference to FIGS. 1 to 6.

Figure 1:
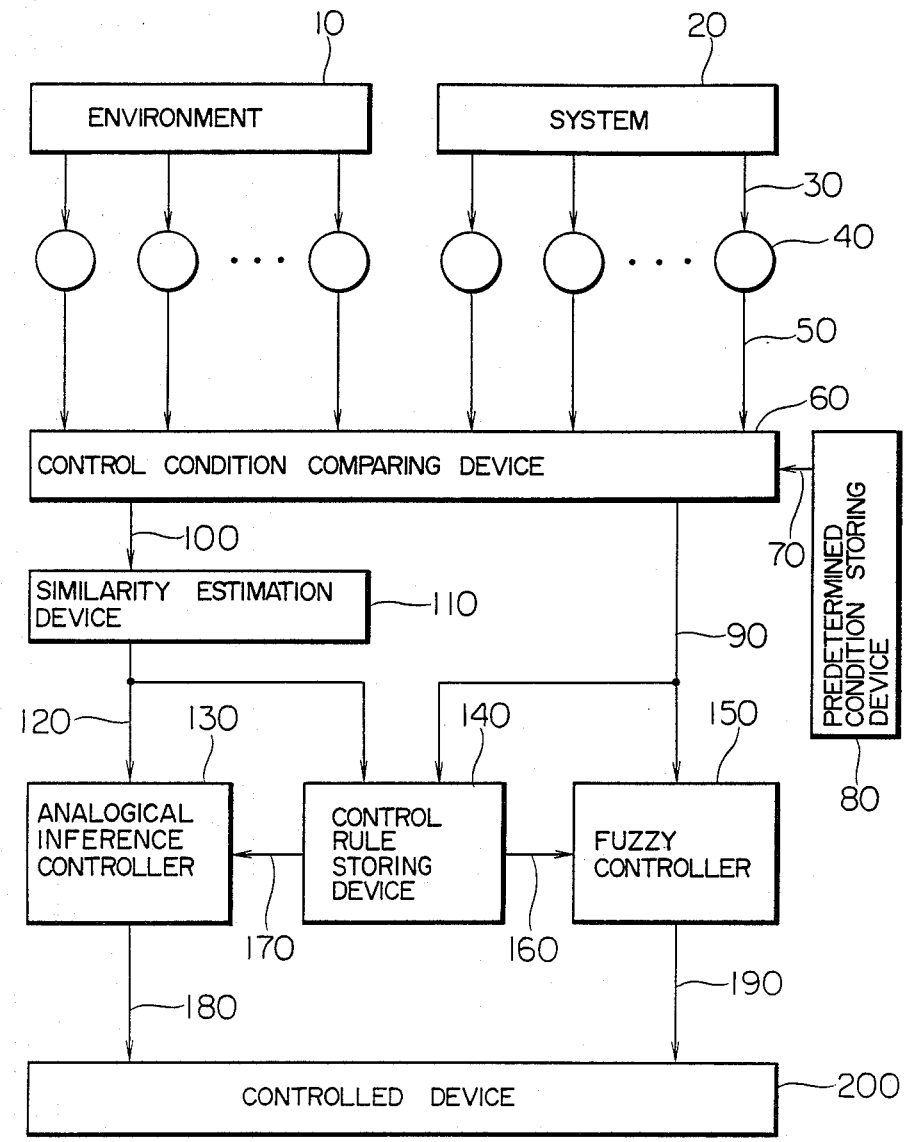
FIG. 1 is a block diagram showing an embodiment of an analogical inference control system according to the present invention.

FIG. 1 shows the construction of the present embodiment. Referring to FIG. 1, a signal 30 from the environment 10 of a system 20 or from the system 20 itself is detected by a person or detector 40, which sends a signal 50 to a control condition comparing device 60. The device 60 checks whether or not a control condition which is detected by the person or detector 40, and is indicated by the signal 50, is included in predetermined control conditions which are stored in a predetermined condition storing device 80 and which are sent to the comparing device 60 by a signal line 70. In a case where the detected control condition is included in the predetermined control conditions, the detected control condition is sent to a fuzzy controller 150 by a signal 90. While, in a case where the detected control condition is not included in the predetermined control conditions, the detected control condition is sent to a similarity estimation device 110 by a signal line 100. The similarity estimation device 110 estimates the degree of similarity between the detected control condition and an appropriate one of the predetermined control conditions, and sends the degree of similarity to an analogical inference controller 130 by way of a signal line 120. A control rule which is one of a plurality of control rules stored in a control rule storing device 140 and which corresponds to the degree of similarity is sent to the analogical inference controller 130 by a signal line 170. The analogical inference controller 130 infers analogically a control value on the basis of the control rule from the storing device 140 and the degree of similarity, and sends the control value to a controlled device 200 by a signal 180, to operate the device 200. The fuzzy controller 150 calculates a control value on the basis of the detected control condition and a control rule which is sent from the control rule storing device 140 to the fuzzy controller 150 by a signal 160 and which corresponds to the degree of similarity, and sends the control value to the controlled device 200 by a signal 190, to operate the device 200. In other words, the fuzzy controller 150 is provided for a case where the detected control signal is included in the predetermined control conditions, and the analogical inference controller 130 is provided for a case where the detected control condition is not included in the predetermined control conditions.

The operation of each part of the present embodiment will be explained below in detail, for a case where the system 20 is an automobile.

The environment 10 indicates weather, the condition of a road surface, and other conditions, for example. The signal 30 indicating the state of each of these environmental elements is detected by the detector 40 or a person. For example, weather conditions such as fine weather, a hard rain, a hard snow and a heavy wind are detected, and road conditions such as an asphalted road, a gravel road and a rough road are detected. Further, various conditions of the system 20 (namely, the automobile) such as the velocity, acceleration, inclination and vibration of the automobile and the rotational angle of a handle, are detected. The signal signals 50 indicating the above conditions are sent from the detector 40 to the control condition comparing device 60.

The predetermined condition storing device 80 stores predetermined control conditions in the form of IF-THEN rules, for example, the conditional clause of IF-THEN rule that "if the road is a superhighway, then the pressure of an air spring is made as low as 20 atm., to slightly reduce the spring action and to give a comfortable drive", and the conditional clause of another IF-THEN control rule that "if the rain falls hard, then the speed of the automobile is made as low as 30 km/hr". In general, the rule is expressed in the form of "if x→A then y→B".

In the control condition comparing device 60, a predetermined control condition which is stored in the predetermined condition storing device 80 and is sent to the control condition comparing device 60 by the signal 70, that is, a predetermined control condition x→A is compared with a detected control condition z→C.

When it is judged by the comparing device 60 that x=z and A=C, the detected control condition z→C is sent to the fuzzy controller 150 by the signal line 90. Otherwise, the detected control condition z→C is sent to the similarity estimation device 110 by the signal line 100, to estimate the degree of similarity.

Although the degree of similarity may be determined by a person, a method of calculating the degree of similarity from the detected control condition and a predetermined control condition, will be explained below. This method utilizes the overlapping of conceptional structures. For example, the concept of an apple has a dimension which is formed of a plurality of dimensions such as color, shape and taste, and the concept of speed has a dimension which is formed of the dimension of length and the dimension of time.

Now, let us calculate the degree of similarity between the speed x and the distance z, by way of example. The degree $g(x, z)$ of similarity between the speed x and the distance z is defined as follows:

$$g(x, z) = \frac{f(x, z)}{f(x) + f(z) - f(x, z)} \quad (1)$$

here f(i) indicates the sum of the absolute values of the exponents of the dimensions included in the concept i. The dimension of the speed x is given by length divided by time $[LT^{-1}]$, and hence f(x) is equal to two (2). Further, f(i, j) in the equation (1) indicates the absolute value of the exponent of the common dimension included in both the concept i and the concept j. In a case where a plurality of common dimensions are included in the concept i and the concept j, the function f(i, j) indicates the sum of the absolute values of exponents of the common dimensions. In the present example, the common dimension is lenght [L], and hence f(x, z) is equal to one (1). Thus, the degree $g(x, z)$ of similarity between the speed x and the distance z is given by the following equation:

$$g(x, z) = \frac{1}{(1 + 1) + (1) - (1)} = 0.5$$

The above value "0.5" is sent to the analogical inference controller 130 by the signal line 120. In the analogical inference controller 130, a control value is inferred from the degree of similarity and a control rule, which is stored in the control rule storing device 140, is sent to the analogical inference controller 130 by the signal line 170, for example, a control rule that "if x→A then z→C".

In order to facilitate the understanding of an analogical inference method for a control system, a fuzzy control method will be explained prior to the explanation of the analogical inference method.

In fuzzy control, the fuzzy controller 150 carries out the following processing on the basis of the signal on line 90 and the signal on line 160 which indicates a control rule stored in the control rule storing device 140.

Now, let us suppose that the control rule storing device 140 stores two control rules shown in FIG. 2, that is, a control rule R1 that "if x→$A_1$, then y→$B_1$" and another control rule R2 that "if x→$A_2$ then y→$B_2$". Usually, the terms $A_1$, $A_2$, $B_1$ and $B_2$ are qualitatively expressed. For example, expressions such as "the road is rough" and "the spring action is slightly reduced", are used. In general, these terms can be expressed by membership functions in the fuzzy set theory, as shown in FIG. 2.

Now, let us suppose that the signal on line 90 indicates $x=x_o$. Then, a function $B_1^*(y)$ for the control rule R1 is calculated by the following equation:

$$B_1^*(y) = A_1(x_o) \cdot B_1(y) \quad (2)$$

where $A_1(x)$ indicates a membership function in a fuzzy set $A_1$ and $B_1(y)$ indicates a membership function in a fuzzy set $B_1$. The function $B_1^*(y)$ is indicated by a dot-dash line in FIG. 2.

In a case where a control rule includes a plurality of conditional clauses "x→$A_1$", "v→$G_1$" and so on, a minimum operation $A_1(x_o) \wedge G_1(v_o) \wedge$----, namely, an operation for determining a minimum value of $A_1(x_o)$, $G_1(v_o)$ and so on, is performed, and then the product of $\{A(x_o) \wedge G_1(v_o) \wedge$----$\}$ and $B_1(y)$ is calculated to obtain the function $B_1(y)$.

A function $B_2^*(y)$ for the control rule R2 can be calculated in the same manner as the function $B_1^*(y)$. The function $B_2^*(y)$ is indicated by another dot-dash line in FIG. 2.

Figure 3:
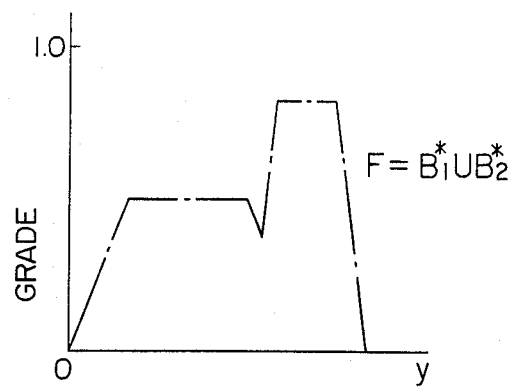
FIG. 3 is a graph showing the logical sum of respective operation parts of two fuzzy control rules.

Next, a function $F = B_1^* U B_2^*$ is determined as indicated by a dot-dash line in FIG. 3. A value $Y_o$ which is sent to the controlled device 200 by the signal line 190 to control the automobile, is given by the following equation:

$$y_o = \frac{\int y \cdot F(y) dy}{\int F(y) dy} \quad (3)$$

Now, let us suppose that the signal 50 applied to the control rule comparing device 60 indicates a control condition "z→C" which is different from the predetermined control conditions. Further, let us suppose that only the control rule R1 is stored in the control rule storing device 140 as a control rule which corresponds to the degree of similarity and is sent to the analogical inference controller 130 by the signal 170. In a case where there are a plurality of control rules as those which correspond to the degree of similarity, an appropriate control value can be determined by superposition in the same way as the following inferring method.

An analogical inference control operation will be explained for nine cases which are classified by the similarity between x and z and the similarity between $A_1$ and C. It is to be noted that when it is hard to detect the terms z and C by instruments, these terms are detected by a person to determine the degree of similarity between x and z and the degree of similarity between $A_1$ and C.

CASE (1): A case where the item x is equal to the item z and the state $A_1$ is equal to the state C. This case corresponds to the fuzzy control, and thus a control value is determined by the fuzzy controller 150.

Figure 4:
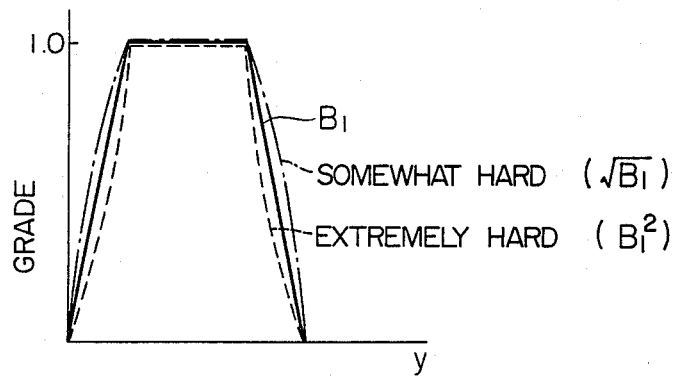
FIG. 4 is a graph showing those modified versions of the operation part of a fuzzy control rule which are formed in accordance with modifiers.

CASE (2): A case where the item x is equal to the item z and the state $A_1$ is similar to the state C. An example of the above is a case where "x→$A_1$" is a condition that the rain falls hard, and "z→C" is a condition that the rain falls extremely hard. The terms "extremely", "somewhat", "fairly", and so on are generally called a "modifier". In the above case, the membership function $B_1$ shown in FIG. 2 is modified by a factor h corresponding to the modifier. FIG. 4 shows examples of a modified membership function $(B_1)^h$. In a case where a control rule that if the rain falls hard, then the speed of automobile is reduced, is stored in the control rule storing device 140, and a control condition that the rain falls extremely hard, is detected, the analogical inference controller 130 infers an operation that the speed of automobile is reduced extremely. Thereafter, a control value is determined in the same manner as in the fuzzy control operation.

CASE (3): A case where the item x is equal to the item z but the state $A_1$ bears no similarity to the state C. An example of the above is a case where "x→$A_1$" is a condition that the rain falls hard and "z→C" is a condition that a gentle rain falls. In this case, the detected control condition is considered to bear no similarity to the stored control condition, and thus the factor h is made equal to zero. The modified version of the membership function $B_1(y)$ is given by $\{B_1(y)\}^h$ as shown in FIG. 4. In the above case, the equation (3) containing the modified membership function $\{B_1(y)\}^h$ becomes indefinite, that is, the value $y_o$ is indefinite. In other words, when the detected control condition is different from the stored control condition, the value $y_o$ cannot be determined, and thus it is impossible to obtain an appropriate result. Accordingly, when the value $y_o$ cannot be determined, the state quantity y is returned to a reference value $y_s$, or is kept at the present value.

Figure 5:
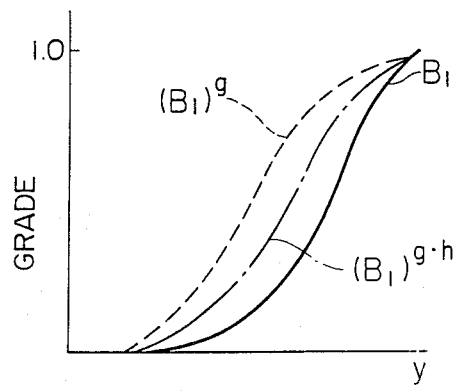
FIG. 5 is a graph showing those modified versions of the operation part of a fuzzy control rule which are formed in accordance with a modifier and/or the degree of similarity.

CASE (4): A case where the item x is similar to the item z and the state $A_1$ is equal to the state C. An example of the above is a case where "x→$A_1$" is a condition that the rain falls hard, and "z→C" is a condition that the sleet falls hard. In this case, the membership function $B_1(y)$ is converted into $\{B_1(y)\}^g$, where g indicates the degree of similarity defined by the equation (1) and satisfies a relation $0 \leq g \leq 1$. Thus, the operation part (that is, "y→$B_1$") of the control rule becomes fuzzy in accordance with the degree of similarity, as shown in FIG. 5. Thereafter, a control value is determined in the same manner as in the fuzzy control operation.

CASE (5): A case where the item x is similar to the item z and the state $A_1$ is similar to the state C. An example of the above is a case where "x→$A_1$" is a condition that the rain falls hard and "z→C" is a condition that the sleet falls fairly hard. In this case, the membership function $B_1(y)$ is converted into $\{(B_1(y)\}^{g \cdot h}$, where g indicates the degree of similarity and h is the factor corresponding to a modifier. Thereafter, a control value is determined in the same manner as in the fuzzy control operation. An example of the modified membership function $\{B_1(y)\}^{g \cdot h}$ is shown in FIG. 5.

CASE (6): A case where the item x is similar to the item z but the state $A_1$ bears no similarity to the state C. An example of the above is a case where "x→$A_1$" is a condition that the rain falls hard and "z→C" is a condition that a gentle sleet falls. In this case, the factor h is zero, and hence the modified membership function $(B_1(y)\}^{g \cdot h}$ is equal to one. Accordingly, the value $y_o$ becomes indefinite as in the CASE (3).

CASE (7): A case where the item x bears no similarity to the item z but the state $A_1$ is equal to the state C. An example of the above is a case where "x→$A_1$" is a condition that the rain falls hard and "z→C" is a condition that the wind blows hard. In this case, the degree g of similarity is zero, and hence the value $y_o$ becomes indefinite as in the CASE (3).

CASE (8): A case where the item x bears no similarity to the item z but the state $A_1$ is similar to the state C. In this case, the degree g of similarity is zero, and hence the value $y_o$ becomes indefinite as in the CASE (3).

CASE (9): C case where the item x bears no similarity to the item z and the state $A_1$ bears no similarity to the state C. In this case, the degree g of similarity is zero, and hence the value $y_o$ becomes indefinite as in the CASE (3).

Figure 6:
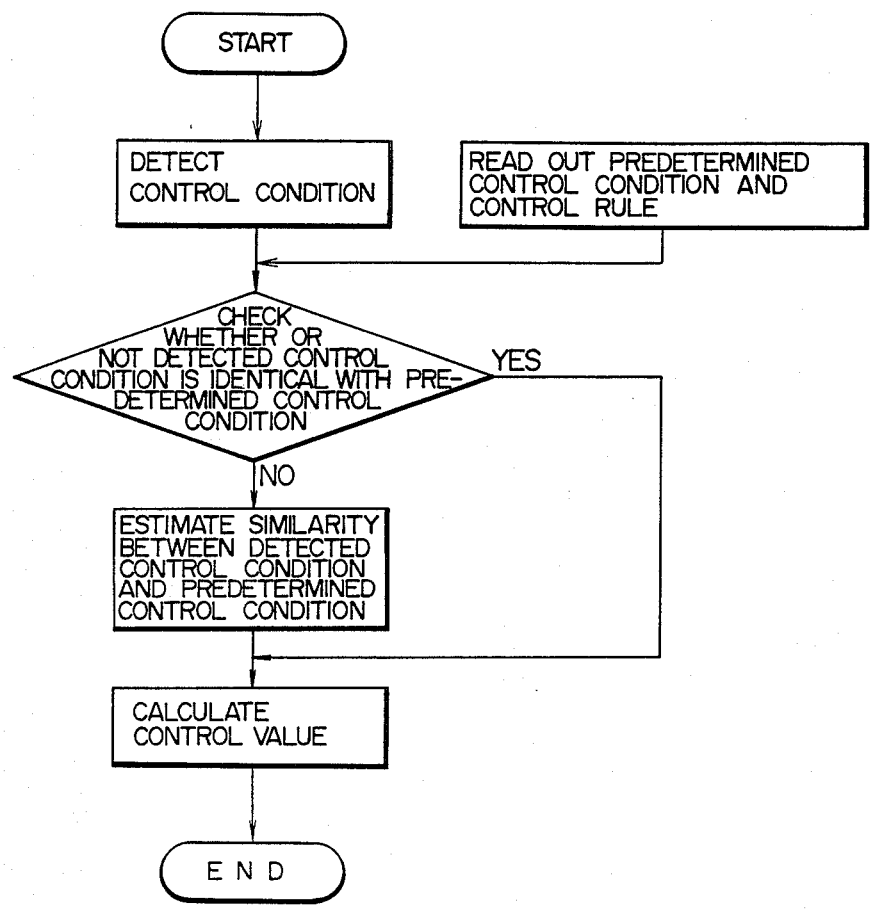
FIG. 6 is a flow chart showing the procedure in the system control according to the presen invention.

FIG. 6 is a flow chart showing an example of the procedure in the analogical inference apparatus for control system according to the present invention. The present embodiment shown in FIG. 1 can perform an analogical inference operation in accordance with the flow chart of FIG. 6.

When used for controlling an automobile, the present embodiment can exhibit the following effects.

(1) Even in a case where the detected control condition is different from control conditions stored in the predetermined condition storing device, if the detected condition is similar to one of the stored control conditions, the automobile can be controlled on the basis of the detected control condition.

(2) It is possible to perform a control operation by analogical inference, and hence the number of control rules stored in the control rule storing device can be made smaller, as compared with a conventional control system.

(3) Even when a control condition has fuzziness, it is possible to control the automobile.

(4) Even when a control condition includes a fuzzy item such as comfortableness in driving, the automobile can be controlled.

In a case where the present embodiment is applied to public systems (such as a water supply system, a sewerage system and a traffic system), a power supply system, and a nuclear power plant, the above-mentioned control rules are prepared in accordance with these systems and plant, and then a control operation is performed in the same manner as in the automobile.

As can be seen from the foregoing explanation, the present invention has the following advantages.

(a) A control value can be determined by analogical inference on the basis of the degree of similarity, and hence not only the number of control rules used can be reduced but also various situations and complicated problems can be treated.

(b) The number of control rules stored in a memory device can be reduced, and hence the memory device is not required to have a large capacity.

(c) Only typical control rules are used for performing an analogical inference for control operation, and hence the efficiency in preparing control rules is improved.

(d) Even when a detected control condition is different from predetermined control conditions, a necessary control operation can be performed by inference.

Thus, the present invention can improve not only the efficiency in designing control rules but als the utilization efficiency of control rules.

We claim:

1. An analogical inference apparatus for a control system comprising:
   detection means for detecting a present control condition;
   storage means for storing a plurality of predetermined control conditions in the form of IF-conditions forming a part of an IF-THEN rule;
   comparing means for comparing a detected control condition with said plurality of predetermined control conditions read out from said storage means to correlate said detected control condition with said predetermined control conditions and select a predetermined control condition related to said detected control condition;
   estimation means for estimating the degree of similarity between said detected control condition and a predetermined control condition selected by said comparing means; and
   analogical inference means for determining a control value, by analogical inference, on the basis of the estimated degree of similarity determined by said estimation means.

2. An anlogical inference apparatus for a control system according to claim 1, further comprising modifying means for modifying said control value in accordance with the estimated degree of similarity determined by said analogical inference means.

3. An apparatus according to claim 1, wherein said analogical inference means includes means for storing control rules, and inference control means for calculating control values by using a stored control rule and said degree of similarity.

4. An apparatus according to claim 3, wherein said control rules are expressed in a rule format.

5. An apparatus according to claim 3, wherein said analogical inference means includes correction means for correcting said control value in accordance with said degree of similarity.

6. An apparatus according to claim 1, wherein said analogical inference means includes fuzzy control means for determining said control value by a fuzzy control technique when said detected control condition and said predetermined control condition are equal and outputting said control value.

7. An apparatus according to claim 1, wherein said estimation means comprises for calculating the degree of similarity by using overlap of a concept structure for defining a control condition.

8. An analogical inference apparatus for a control system comprising:
   detection means for detecting the control condition at a current time;
   first storing means for storing known control conditions which are provided beforehand;
   comparing means for comparing a detected control condition with a known control condition to examine whether the detected control conditon agrees with the known control condition and for outputting an agreement signal or non-agreement signal depending on the result of said comparing;
   estimation means responsive to receipt of said non-agreement signal for estimating a degree of similarity between said detected control condition and said known control condition;
   second storing menas for storing control rules;
   analogical inference means for analogically inferring a control value by using an estimated degree of similarity and a control rule which is selected by using the estimated degree of similarity and determining the control value; and
   fuzzy control means for determining a control value by a fuzzy control technique using said agreement signal and a control rule selected in accordance with said agreement signal.

9. An analogical inference method for a control system comprising the steps of:
   storing in a storage device predetermined control conditons forming part of IF-THEN rules;
   comparing the detected control condition with predetermined control conditions read out from said storage device to check whether or not said detected control condition agrees with any of said predetermined control condition;
   estimating the degree of similarity between said detected control condition and a selected predetermined control conditon when no predetermined control condition exactly corresponds to said detected control condition; and
   determining a control value, by analogical inference. on the basis of the estimated degree of similarity.

10. A method according to claim 9, wherein said determining by analogical inference includes the steps of storing control rules in a storage device, and calculating control values by using a stored control rule and said estimated degree of similarity.

11. A method according to claim 10, wherein said control rule is expressed in a rule form.

12. A method according to claim 10, wherein said analogical inference step includes the step of correcting said control value in accordance with said estimated degree of similarity.

13. A method according to claim 9, wherein said analogical inference step includes the step of determining said control value by a fuzzy control technique when said detected control conditon and said predetermined control conditon are equal and outputting said control value.

14. A method according to claim 9, wherein said estimating step comprises the step of calculating the degree of similarity by using overlap of a concept structure for defining a control condition.

15. An analogical inference method method for a control system comprising the steps of:
   detecting a control condition at current time;
   storing known control conditions which are provided beforehand in a storage device;
   comparing the detected control condition with a known control condition obtained from said storage device to examine whether the detected control condition agrees with the known control condition and for outputting an agreement signal or a non-agreement signal depending on the result of said comparing;
   receiving said non-agreement signal and estimating a degree of similarity between said detected control condition and said known control condition;

storing control rule in a storage device;

analigically inferring a control value by using an estimated degree of similarity and a control rule which is selected by using the estimated degree of similarity and determining the control value; and determining the control value by a fuzzy control technique using said agreement signal and a control rule selected in accordance with said agreement signal.

* * * * *